(12) United States Patent
Freudenberg et al.

(10) Patent No.: US 6,598,864 B2
(45) Date of Patent: Jul. 29, 2003

(54) HYDRAULIC TWO-CHAMBER BEARING FOR DAMPING VIBRATIONS

(75) Inventors: Tillmann Freudenberg, Fürth/Steinbach (DE); Erhard Moog, Gorxheimertal (DE)

(73) Assignee: Carl Freudenberg KG, Weinheim (DE)

( * ) Notice: Subject to any disclaimer, the term of this patent is extended or adjusted under 35 U.S.C. 154(b) by 0 days.

(21) Appl. No.: 10/116,527

(22) Filed: Apr. 4, 2002

(65) Prior Publication Data

US 2002/0163112 A1 Nov. 7, 2002

(30) Foreign Application Priority Data

Apr. 9, 2001 (DE) .......................... 101 17 661

(51) Int. Cl.[7] .................................................. F16F 5/00
(52) U.S. Cl. .................................................. 267/140.13
(58) Field of Search ........................ 267/140.11, 140.15

(56) References Cited

U.S. PATENT DOCUMENTS

| | | | | |
|---|---|---|---|---|
| 4,836,515 A | * | 6/1989 | Franz et al. | 267/219 |
| 5,028,038 A | * | 7/1991 | De Fontenay | 267/140.1 |
| 5,344,127 A | * | 9/1994 | Hettler et al. | 267/140.13 |
| 5,639,073 A | * | 6/1997 | Suzuki et al. | 267/140.13 |
| 5,769,402 A | * | 6/1998 | Ide et al. | 267/140.14 |
| 6,357,730 B1 | * | 3/2002 | Gugsch et al. | 267/140.15 |

FOREIGN PATENT DOCUMENTS

| | | |
|---|---|---|
| DE | 30 27 742 | 2/1982 |
| DE | 32 44 295 | 5/1984 |
| DE | 41 41 332 | 6/1993 |

* cited by examiner

Primary Examiner—Christopher P. Schwartz
(74) Attorney, Agent, or Firm—Kenyon & Kenyon

(57) ABSTRACT

A hydraulic two-chamber bearing for damping vibrations, in particular an engine mount on motor vehicles, having an engine-mount plate, a bearing spring made of rubber-elastic material, a working chamber and a compensation chamber for the liquid which are separated from each other by a partition provided with flow-through openings, and an elastic pressure diaphragm which terminates the compensation chamber, characterized in that the amount of fluid flowing through the openings (6) of the partition (5) is controlled as a function of the amplitude (A) of the vibrations.

17 Claims, 4 Drawing Sheets

HYDRAULIC TWO-CHAMBER BEARING FOR DAMPING VIBRATIONS

BACKGROUND OF THE INVENTION

1. Field of the Invention

The invention relates to a hydraulic two-chamber bearing for damping vibrations, in particular an engine mount on motor vehicles, having an engine-mount plate, a bearing spring made of rubber-elastic material, a working chamber and a compensation chamber for the liquid which are separated from each other by a partition, and an elastic pressure diaphragm that terminates the compensation chamber.

2. Description of Related Art

DE 30 27 742 A1 describes a hydraulically damped two-chamber engine mount, which provides a high degree of damping at a low stiffness, in order to thereby achieve an increasing degree of damping at higher amplitudes and damp out large shocks in an optimum manner. However, the bearing should not react hydraulically to high-frequency, low-amplitude vibrations. For this purpose, the bearing is provided with an intermediate wall in the form of a partition, which reacts to high-frequency, low-amplitude vibrations, and is equipped with a choke or pressure-regulating valve that automatically closes at high pressures. Low amplitudes at a high frequency are damped by a suitable intermediate plate, without liquid being exchanged between the working chamber and the compensation chamber. However, vibrations having increasing amplitudes and a low frequency are increasingly damped by the increasing exchange of fluid. A disadvantage of this solution is that the bearing operates in a relatively narrow range. The method of operation of such a bearing is fixed by the geometry, mass, and stiffness of the vibratory systems used in the bearing. This means that, in each instance, such systems can only be designed for a particular loading case.

In order to achieve an improvement here, engine mounts were equipped with a damping mass. Such a bearing is described in DE 32 44 295 A1. It provides a bearing, in which high vibrational amplitudes of the engine are markedly damped, the maximum damping being adjustable to the natural frequency of the engine, and the hydraulic damping being decoupled at low amplitudes to yield an optimum acoustic response. The damping mass is operated by a permanent magnet having an electric coil, and an electrically controllable decoupling system is present, which allows an additional frequency range to be covered. The general disadvantage of such a bearing is that its action also has to be adjusted to predetermined frequency ranges, in order to be effective in them.

The requirements for an optimum engine mount result from the following two causes, namely the vibrational response of the vehicle body, which is subject to the road conditions, and secondly, the vibrational response of the engine itself, which is dependent on its operating states. Vibrations caused by unevenness of the road are in the low-frequency range of approximately 7 to 8 Hz, and have high amplitudes. In order to counteract this, the bearing should have a high stiffness with a high degree of damping. The damping is achieved by the column of liquid between the two chambers, and by the liquid present in the working chamber in conjunction with the bearing spring made of rubber-elastic material. The liquid flows from the working chamber into the compensation chamber and back, depending on the pressure direction.

The vibrations induced by the mover or driving motor are to be subdivided into two ranges, namely idling-range vibrations having an average frequency of 12 to 15 Hz and medium amplitudes, and vibrations during normal engine operation, which have a wide frequency range and low amplitudes. As a result, a low bearing stiffness with low damping is necessary in the idling range, while a very low bearing stiffness is expected during normal engine operation at higher frequencies. In this case, the bearing should be soft. The latter is attained through the vibrations of the diaphragms used.

In previous two-chamber engine mounts, regardless if they were designed to be passive or active, attention was payed to achieving a high degree of damping with a high bearing stiffness in the low-frequency range up to approximately 30 Hz, and a low stiffness in the frequency range above 30 Hz at low amplitudes. An example of a switchable bearing is known from DE 41 41 332 C2, which can switched over to various frequency ranges. The partition dividing up the chamber is provided with an opening, which can be closed by an actuator. The actuator is actuated by negative pressure and keeps the opening closed during operation. Such a switchable diaphragm can allow the bearing to achieve good working properties.

SUMMARY OF THE INVENTION

It is an object of the invention to provide a bearing design to first of all allow the option of more effectively adjusting the bearing to the vibration frequencies, and secondly render the bearing independent of negative-pressure control. It is a further object of the invention to provide such a bearing for use in diesel engines, where a high degree of damping is desired in the low-frequency range while idling, and where there are no negative-pressure devices for operating the bearing.

These and other objects of the invention are achieved by a hydraulic two-chamber bearing for damping vibrations, in particular an engine mount on motor vehicles, having an engine-mount plate, a bearing spring made of rubber-elastic material, a working chamber and a compensation chamber for the liquid which are separated from each other by a partition provided with flow-through openings, and an elastic pressure diaphragm which terminates the compensation chamber, wherein the amount of fluid flowing through the flow-through openings (6) of the partition (5) is controlled as a function of the amplitude (A) of the vibrations. The invention deviates from the previous bearing designs, which are directed towards damping low-frequency vibrations and providing high-frequency acoustic insulation, and replaces them with a two-chamber bearing, which is able to steplessly change from damping low-frequency, high amplitude vibrations to damping high-frequency, low-amplitude vibrations, so that a bearing can be manufactured, which ranges from having a high stiffness for the lowest frequencies up to the highest elasticity at the highest frequencies. This is achieved by controlling the amount of liquid flowing through the partition openings, as a function of the amplitude of the vibrations. The lower the frequency and the higher the amplitudes, the lower the amount of liquid flowing through the openings, and vice versa. This can be carried out to such an extent that the flow is completely blocked at the lowest frequencies, and the openings are completely unblocked at very high frequencies.

BRIEF DESCRIPTION OF THE DRAWINGS

The present invention will be described in greater detail with reference to the following drawings wherein.

DETAILED DESCRIPTION OF THE INVENTION

The design approach for controlling the amount of fluid flowing through the openings does not provide for the openings being continuously closable, using an oscillating actuating element, which is adjacent to the partition, can be adjusted with respect to the partition, and is provided with flow-through channels that correspond to the flow-through openings and cover and unblock the openings. The actuating element is moved at a frequency that is greater than the vibration frequency generated by the roadway or the idling speed of the engine. This allows the bearing to react extremely rapidly to frequency changes occurring in the vibration response.

The adjusting movement of the actuating element is preferably carried out at an oscillation frequency, which is at least x times, and preferably y to z times the idling frequency of the engine. The flow-through openings are completely unblocked by the actuating element at frequencies greater than 30 Hz. Acoustic vibrations are then damped by the liquid column alone. The oscillatory movement of the actuating element is then stopped.

The actuating element is mounted without a limit stop, so as to be able to oscillate freely. It can be driven by a rotary magnet or also an electric motor 39. In this case, the partition can be aligned perpendicularly to the bearing axis and separate the chambers in the axial direction. The flow-through openings of the partition are then opened or closed by rotating an actuating disk used as an actuating element.

Another possibility is to align the partition longitudinally with respect to the bearing axis and to separate the chambers in the radial direction. The openings in the partition are then unblocked or closed by an axially movable actuating ring.

The actuating elements can be moved in opposition to spring force. Other solutions are also conceivable here, or even just the use of a rotary magnet that continuously changes its direction of rotation.

The actuating element can be situated on the face of the partition pointing towards the compensation chamber. It is also conceivable to position it on the face of the partition pointing towards the working chamber.

The driving mechanism for the actuating element depends on the configuration of the actuating element itself, and can likewise be situated inside or outside the working chamber.

Figure 1:
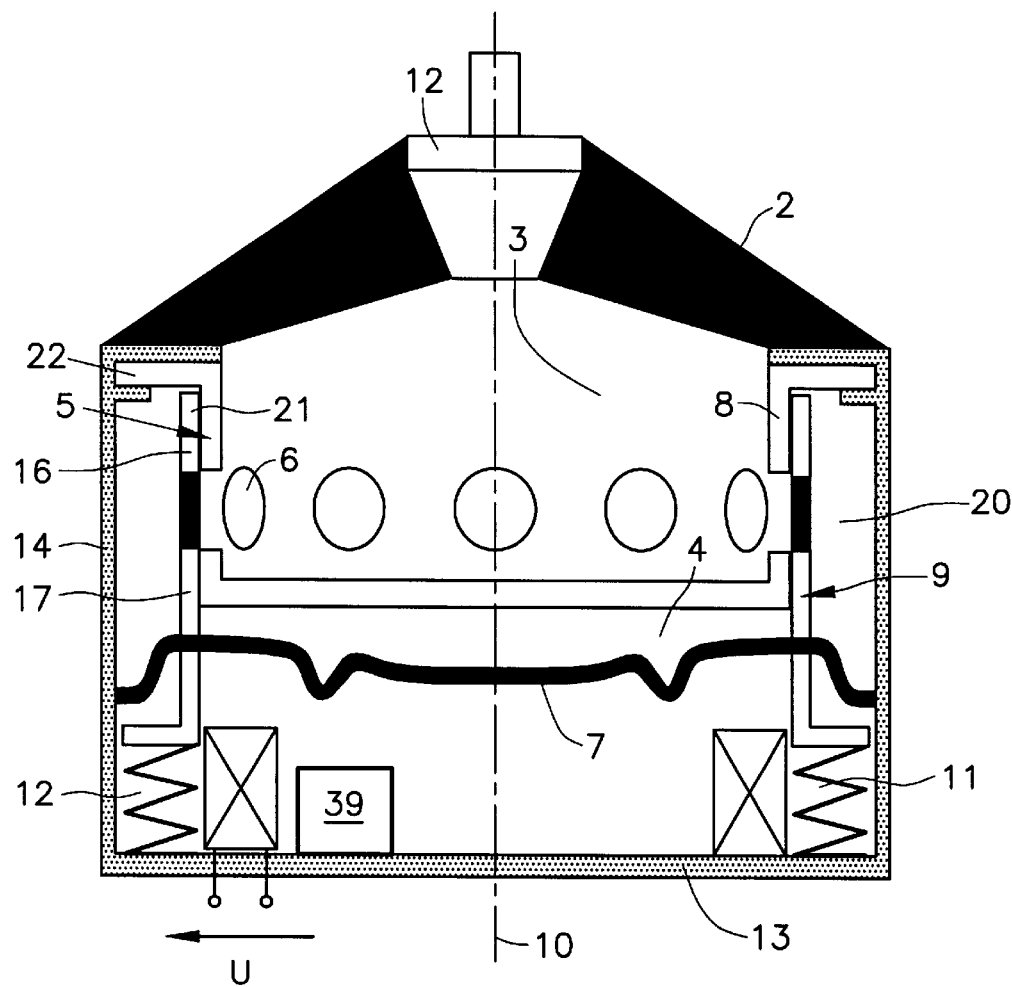
FIG. 1 shows a schematic representation of a two-chamber bearing having an axially oscillating actuating element, in which case the flow-through openings are closed.

FIG. 1 illustrates a hydraulic two-chamber bearing 1, which includes the bearing spring 2 made of rubber-elastic material, and underlying working chamber 3 and compensation chamber 4 for the liquid poured into them. Working chamber 3 and compensation chamber 4 are separated by partition 5, which is provided with flow-through openings 6. Compensation chamber 4 is sealed on the outside by rolling diaphragm 7. Partition 5 is cup-shaped, and its side wall 8 is enclosed by actuating element 9, which closes and opens openings 6. Actuating element 9 may be moved along bearing axis 10. The actuating element is moved upward by springs 11 and moved in the opposite direction by magnet 12. Spring 11 and actuating magnet 12 are situated at base 13 of a housing 14. The outer edge of the rolling diaphragm is fixed to wall 14. In addition, actuating element 9 takes the form of an actuating ring and is surrounded by rolling diaphragm 7 in a liquid-tight manner. Housing 14 is joined to the vehicle body, and engine-mount plate 15 is joined to an engine, using methods known per se. The actuating ring is provided with flow-through openings 16 and 17, through which the liquid can flow out of working chamber 3 into compensation chamber 4, and vice versa, when the actuating ring is in the appropriate position relative to flow-through openings 6.

The engine mount has its greatest stiffness in the position of actuating ring 9 indicated here. Flow-through openings 6 are closed by actuating ring 9. The high pressure exerted on engine-mount plate 15 and housing 14 causes bearing spring 2 to bulge out in the form of an expanding spring. An axial movement of actuating ring 9 initiated by magnet 12 causes actuating ring 9 to move down in opposition to the spring force of spring 11. The liquid from working chamber 3 can then flow through the gap at openings 6 and 16, into side chamber 20 in housing 14, and from there, into compensation chamber 4. This causes the bearing to become more flexible, and its stiffness can be appropriately controlled by magnet 12 and, consequently, actuating ring 9, in a manner allowing it to adjust to the vibration amplitude and/or frequency. Actuating ring 9 is mounted so as to be able to oscillate freely. This is emphasized by the fact that an exposed gap 23 is present between top edge 21 of actuating ring 9 and connecting flange 22 of housing 14.

Figure 2:
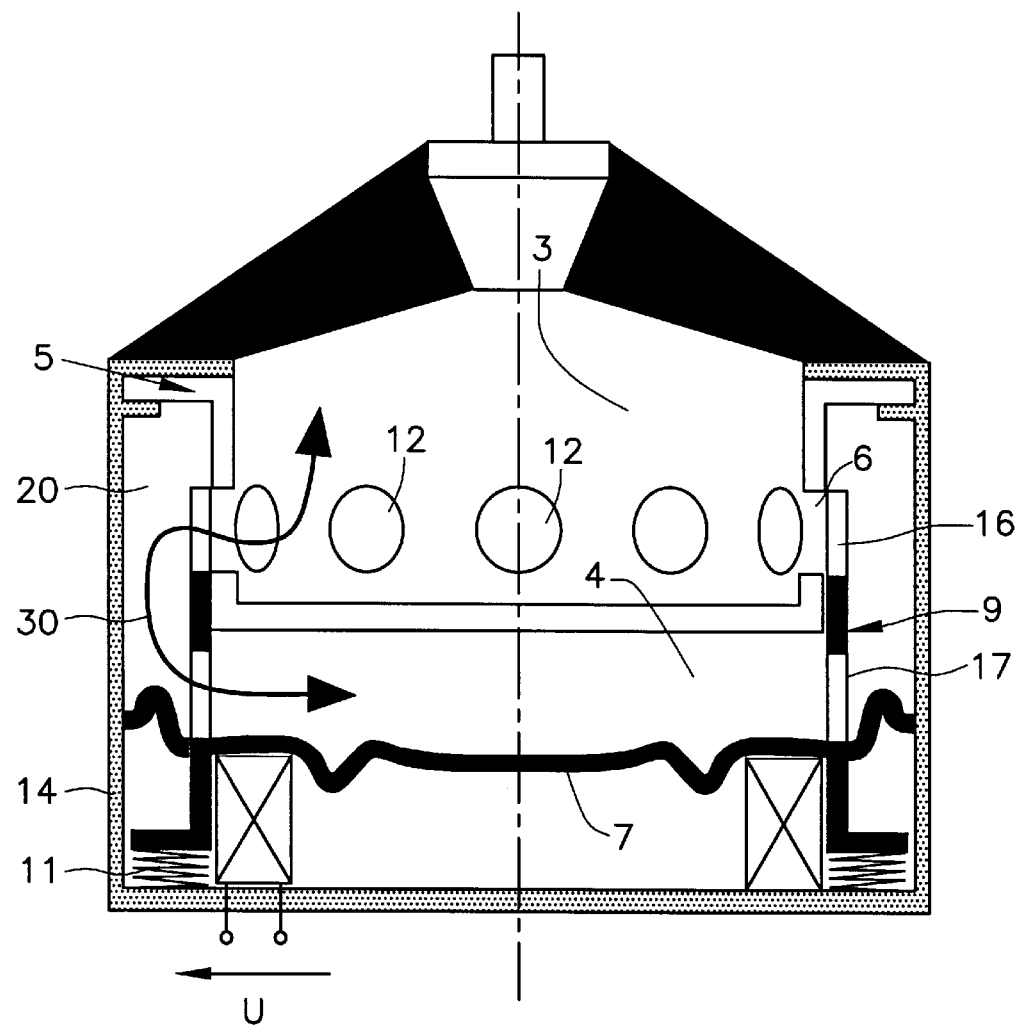
FIG. 2 shows the bearing according to FIG. 1, having flow-through openings that are completely opened.

FIG. 2 shows the bearing according to FIG. 1, where actuating ring 9 is pushed down into its limit position, thereby completely unblocking openings 6. The liquid can now flow in an unhindered manner between working chamber 3 and compensation chamber 4, as a function of the given compression pressure ratios. Arrow 30 indicates the possible flow. Spring 11 is compressed and rolling diaphragm 7 is pulled down. Bearing 1 has its greatest elasticity in this position of actuating ring 9. Openings 6 in partition 5 interact with openings 16 and 17 in actuating ring 9, and possibly with annular space 20 in housing 14, to yield the desired degree of damping in response to higher-frequency vibrations. The bearing design is based on interfering with the transient response of the engine on its elastic bearing, using changes in the stiffness. In this context, it does not matter how the natural vibrations are induced.

Figure 3:
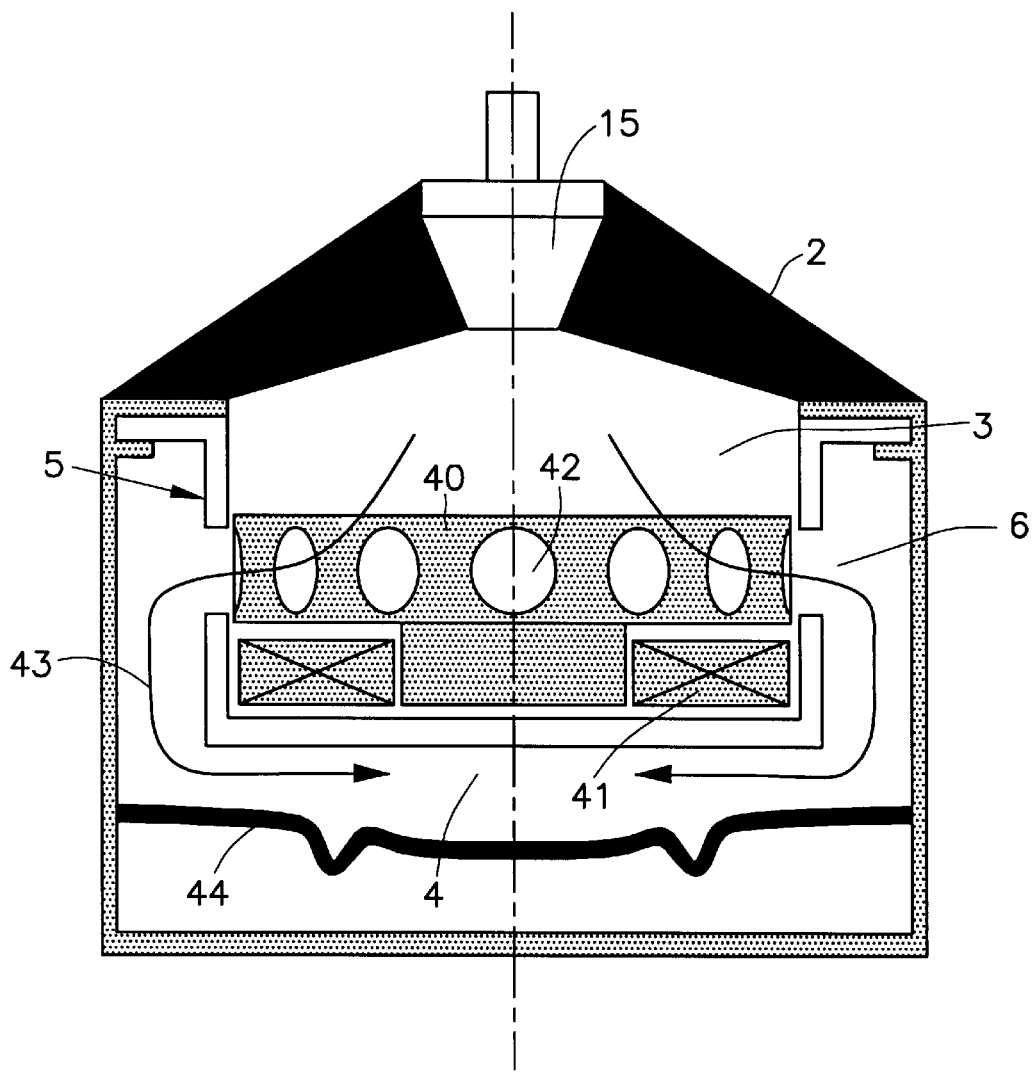
FIG. 3 shows a section of a two-chamber bearing having a rotatable actuating element.

FIG. 3 schematically represents a longitudinal cross section of a specific embodiment, where actuating ring 40 is situated inside working chamber 3 in the form of a rotating ring. This configuration also allows a rotary magnet 41 to be mounted in working chamber 3. Bearing member 15, along with bearing spring 2 and partition 5, have the same design as in the preceding figures. Openings 6 in partition 5 can be opened and closed by appropriately positioning openings 42 in actuating ring 40. In the position shown, openings 42 and 6 overlap, so that the fluid can flow unhindered from working chamber 3 into compensation chamber 4, as is indicated by arrows 43. Compensation chamber 4 is terminated by rolling diaphragm 44. This solution is distinguished by actuating ring 40 being supported in a simple manner. The mass to be accelerated is reduced to a minimum.

Figure 4:
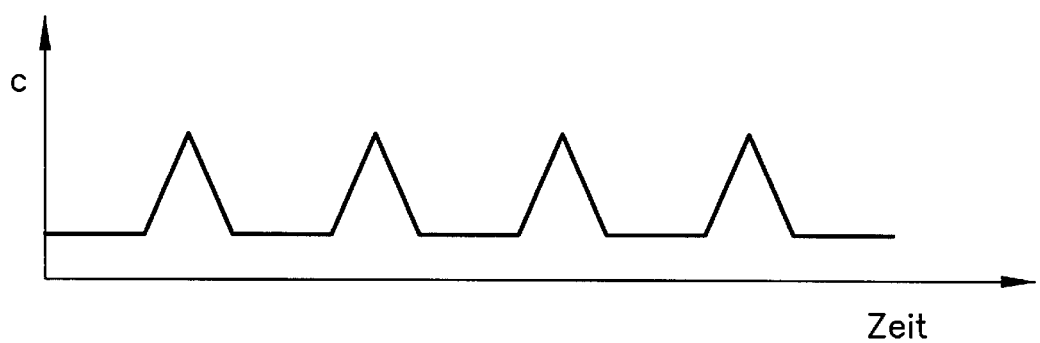
FIG. 4 shows a diagram representing the stiffness characteristic of the bearing as a function of time.

Represented in FIG. 4 is a diagram, in which the stiffness of the bearing is plotted as a function of time. This stiffness characteristic shown by way of example allows the bearing to optimally react to the frequencies exciting it. This stiffness curve was developed with the aid of a simulation program. Only the actuating system described above allows such a stiffness characteristic to be generated with the required accuracy. However, it is certainly conceivable for other stiffness characteristics producing a similar effect to be generated by the described bearing design, as well.

What is claimed is:

1. A hydraulic two-chamber bearing for damping vibrations, comprising:

an engine-mount plate;

a bearing spring made of rubber-elastic material;

a working chamber and a compensation chamber for a fluid which are separated from each other by a partition provided with flow-through openings; and an elastic pressure diaphragm which terminates the compensation chamber, wherein the amount of fluid flowing through the flow-through openings of the partition is adjustably controlled during operation as a function of the amplitude of the vibrations.

2. The hydraulic two-chamber bearing according to claim 1, wherein the flow-through openings are continuously closable, using an oscillating actuating element, which is adjacent to the partition, can be moved with respect to the partition, and is provided with flow-through channels that correspond to the flow-through openings and cover and unblock the flow-through openings.

3. The hydraulic two-chamber bearing according to claim 2, wherein the actuating element is moved at a frequency, which is greater than the vibration frequency generated by the road surface or the idling speed of the engine.

4. The hydraulic two-chamber bearing according to claim 1, wherein the partition is aligned longitudinally with respect to the bearing axis and separates the chambers in the axial direction, and the flow-through openings of the partition are opened and closed by an axially movable actuating ring.

5. The hydraulic two-chamber bearing according to claim 4, wherein the actuating elements are moved in opposition to spring force.

6. The hydraulic two-chamber bearing according to claim 1, wherein the actuating element is moved at a frequency, which is greater than the vibration frequency generated by the road surface or the idling speed of the engine.

7. The hydraulic two-chamber bearing according to claim 1, wherein the actuating element only partially closes the flow-through openings at higher frequencies.

8. The hydraulic two-chamber bearing according to claim 1, wherein the actuating element completely unblocks the flow-through openings at frequencies greater than 30 Hz.

9. The hydraulic two-chamber bearing according to claim 1, wherein the oscillatory motion of the actuating elements is stopped at an engine speed greater than the idling-speed range, when the flow-through openings are completely opened.

10. The hydraulic two-chamber bearing according to claim 1, wherein the actuating element is mounted so as to be able to oscillate freely, without a limit stop.

11. The hydraulic two-chamber bearing according to claim 1, wherein the partition is aligned perpendicularly to the bearing axis and separates the chambers in the axial direction, and the flow-through openings of the partition are opened and closed by a rotatable actuating disk.

12. The hydraulic two-chamber bearing according to claim 1, wherein the partition is aligned longitudinally with respect to the bearing axis and separates the chambers in the axial direction, and the flow-through openings of the partition are opened and closed by a rotatable actuating ring.

13. The hydraulic two-chamber bearing according to claim 1, wherein at least one of a rotary magnet and an electric motor causes the actuating element to oscillate.

14. The hydraulic two-chamber bearing according to claim 1, wherein at least one of a rotary magnet and an electric motor is mounted inside the working chamber.

15. The hydraulic two-chamber bearing according to claim 1, wherein the actuating element is situated on the surface of the partition pointing towards the compensation chamber.

16. The hydraulic two-chamber bearing according to claim 1, wherein the actuating element is situated on the surface of the partition pointing towards the working chamber.

17. The hydraulic two-chamber bearing according to claim 1, wherein the flow-through openings in the partition are matched to at least one of the openings, and the annular chamber of the housing, so as to be used as a liquid column for damping high-frequency vibrations.

* * * * *